Dec. 15, 1931.  E. F. ROSSMAN  1,836,399

HYDRAULIC SHOCK ABSORBER

Filed Aug. 5, 1929

Inventor
Edwin F. Rossman
By Spencer, Hardman and Fehr
His Attorneys

Patented Dec. 15, 1931

1,836,399

UNITED STATES PATENT OFFICE

EDWIN F. ROSSMAN, OF DAYTON, OHIO, ASSIGNOR TO DELCO-PRODUCTS CORPORATION, OF DAYTON, OHIO, A CORPORATION OF DELAWARE

HYDRAULIC SHOCK ABSORBER

Application filed August 5, 1929. Serial No. 383,621.

This invention relates to improvements in hydraulic shock absorbers.

It is among the objects of the present invention to provide a shock absorber of simple structure and design, compact and capable of being commercially produced at a minimum cost of time and material.

Further objects and advantages of the present invention will be apparent from the following description, reference being had to the accompanying drawings wherein a preferred embodiment of one form of the present invention is clearly shown.

Figure 1:
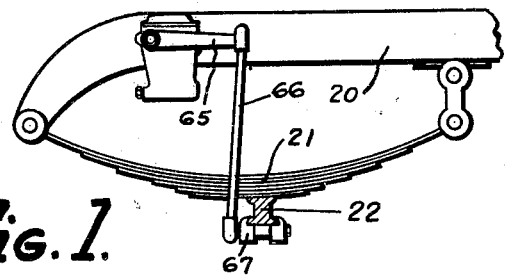
Fig. 1 is a front portion of the frame of an automotive vehicle supported by springs upon the usual axle, the shock absorber embodying the present invention being shown applied thereto.

Referring to the drawings, the numeral 20 designates the frame of the vehicle supported by springs 21 upon the vehicle axle 22.

The shock absorber comprises a casing 23 presenting a fluid reservoir 24 and a cylinder 25. A cover cap 26 closes the upper end of the casing.

Figures 2, 3:
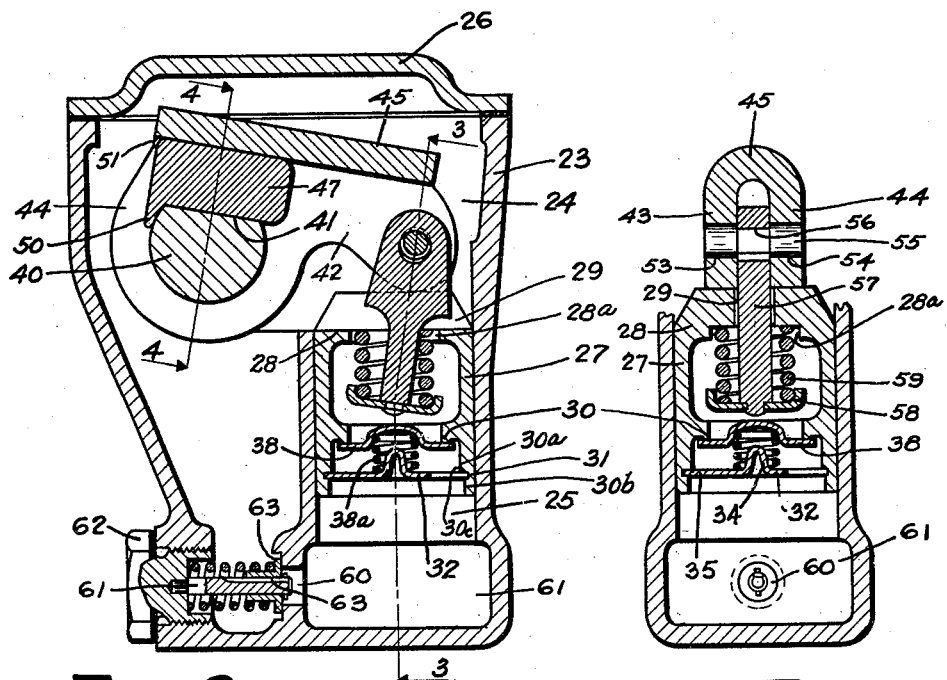
Fig. 2 is a longitudinal section taken through the shock absorber.
Fig. 3 is a sectional view taken along the line 3—3 of Fig. 2.

Within the cylinder 25 there is provided a piston 27 having a head portion 28. A transverse slot 29 is provided in the head portion, said slot communicating with a recess 28a in the inner side of the piston head, providing for the transfer of fluid from one piston to the other as will be explained hereinafter. On the inside of the piston there is provided an annular flange forming a valve-seat 30. An annular groove 31 is formed in the inside surface of the skirt of the piston, spaced from the valve-seat 30. As shown in Fig. 2, the portion 30a of the piston skirt directly above the groove 31 is of lesser inside diameter than the portion 30b beneath said groove so that a shoulder 30c is provided.

Figures 4, 5, 6:
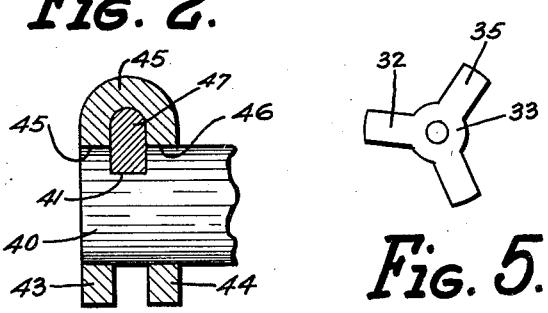
Fig. 4 is a fragmentary sectional view taken along the line 4—4 of Fig. 2.
Figs. 5 and 6 are detail views illustrating the trivet of the valve mechanism.

A trivet or three legged spider 32 has a central portion 33 provided with a hump 34 the legs 35 of the trivet being shaped as in Fig. 6 before said trivet is placed in the position in the piston. To secure the trivet in the piston it is placed so that the end of its legs engages shoulder 30c whereby the legs of the trivet aline with the slot 31. The trivet is then bent or straightened so that its legs, in spreading will enter into the annular groove 31 whereby the trivet or spider 32 is rigidly supported by the piston. Before the trivet is attached to the piston, a valve 38 is placed upon the valve-seat 30. A spring, 38a seated upon the central body portion 33 of the trivet and about the hump 34 thereof, will engage the valve 38 and yieldably urge it against the valve-seat 30. This valve 38 is termed the intake-invalve of the piston and controls the flow of fluid through the passage provided by the slot 29 and the recess 28a.

The casing supports a rocker shaft 40, said rocker shaft having a transverse groove therein the flat bottom surface of which is designated by the numeral 41. A U-shaped rocker arm 42 comprises spaced, substantially parallel side portions 43 and 44 connected by a web portion 45. The side portions 43 and 44 have aligned openings 45 and 46 respectively adjacent one end of the rocker arm, said openings receiving the rocker shaft 40. A wedge 47 is inserted into the slot in the rocker-shaft 40 which slot provides the flat surface 41. The upper edge of the wedge engages the inner surface of the web portion 45 of the rocker-arm, the lower edge of the wedge engages the flat surface 41 of the slot in the shaft. To prevent accidental removal of the wedge 47 a tongue 50 is provided thereon which limits the introduction of the wedge into the rocker arm inasmuch as tongue 50 engages the shaft 40. A staked portion 51 on the edge of the rocker arm prevents withdrawal of the wedge. From the aforegoing it may be seen that the wedge 47 secures the arm 42 upon shaft 40 so that said arm will be rotated with said shaft.

Adjacent the free end of the rocker arm 42 sides 43 and 44 are provided with aligned openings 53 and 54 respectively which receive the pin 55 having an annular groove 56 provided in the intermediate portion thereof. A link 57 has a transverse opening at its upper end through which the pin 55 extends whereby the link is secured at one end to the free end of the rocker-arm 42. Link 57 extends through the slot 29 in the piston into the interior thereof, the lower end of the link having the spring retainer cup 58 secured thereto. A spring 59 has one end seated within the retainer cup 58 and the other end extends into the recess 28a and engages the inside surface of the piston 28, said spring yieldably urging the piston so that the outer surface of its head is maintained substantially in engagement with the free end of the rocker arm 42 as is clearly shown in Fig. 3.

A port 60 provides communication between the compression chamber 61 in the cylinder 25 and the fluid reservoir 24. A pressure relief valve 63 is slidably carried upon a pin 61, supported by screw plug 62. This valve controls the flow of fluid through said port 60.

The rocker shaft 40 extends outside the casing 23 and has a shock absorber operating arm 65 provided thereon the free end of which is swively connected to a link 66. Link 66 is also attached to the axle 22 by a clamp 67.

When the road wheels of the vehicle, not shown, strike an obstruction in the roadway springs 21 will be flexed toward the frame 20 causing the link 66 to operate the arm 65 in a counterclockwise direction resulting in a counterclockwise rotation of the rocker shaft 40 and the rocker arm 42. As the rocker arm 42 rotates counterclockwise it will lift the piston 27 through the link and spring connection 57 and 59 respectively so that fluid in the reservoir 24 will exert pressure on the valve 38 to move it from its seat and thus establish a substantially free flow of fluid into the chamber 61.

When the springs 21 have reached the limit of the flexure caused by this certain obstruction, the tendency of said springs is to return to normal unflexed position with a sudden, rebounding movement, which, if permitted would result in disagreeable shocks and jolts being transmitted to the frame of the vehicle. The present device, however, cushions this return movement of the springs for, as the springs begin to move toward normal unflexed position the link 66 will operate the shock absorber operating arm 65 in a clockwise direction causing the rocker shaft 40 and rocker arm 42 to be rotated clockwise thus, the rocker arm 42 will push the piston 27 into its cylinder. Pressure will now be exerted upon the fluid in the compression chamber 61 causing the valve 38 to close tightly. A restricted flow of fluid will be established through the port 60 and through a restricted passage 63 in the valve stem 61, this restriction to the flow of fluid resisting the movement of the piston and consequently the movement of the spring 21. If the fluid pressure within the compression chamber 61 can not be relieved sufficiently by the flow of fluid through the passage 63 in the valve pin 61, the increased pressure will move the valve 63 to open port 60 and thus will be established another flow of fluid through the port 60 sufficient to relieve fluid pressure within the compression chamber. Either fluid flow resists the downward movement of the piston which cushions the return movement of the springs 21 and thus substantially eliminates the transmission of jars and jolts of the vehicle frame.

The rocker arm and the link connecting the rocker arm with the piston are formed from sheet metal greatly reducing production cost of the present device. The construction of the intake valve and the trivet supporting the spring thereof also reduces manufacturing cost and facilitates assembling.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid reservoir and a cylinder; a piston in said cylinder; a lever in said casing, oscillatably supported at one end, the other free end engaging the piston; a link connected at one end to the free end of the oscillatable lever; and a spring secured at one end to the link, the other end of said spring engaging the piston, yieldably urging the piston into engagement with the lever.

2. A shock absorber comprising in combination, a casing presenting a fluid reservoir and a cylinder; a piston in said cylinder, said piston having a transverse slot in its head portion providing a passage through said piston; an oscillatable lever supported at its one end within said casing; a link connected at its one end with the free end of the lever, said link extending through the slot in the piston head into the interior of the piston; a retainer provided at the free end of the link; and a spring interposed between the retainer and the piston, said spring urging the piston into engagement with the free end of the lever.

3. A shock absorber comprising in combination, a casing presenting a fluid reservoir and a cylinder; a piston in the cylinder forming a compression chamber therein, said piston having an opening in its head portion providing for the transfer of fluid from one side of the piston to the other; an annular flange providing a valve-seat in said piston; an annular groove in said piston, spaced from the valve-seat; a trivet having its legs seated within the annular groove; a valve between the valve-seat and the trivet; and a spring carried by the trivet and engaging the valve, yieldably urging said valve into engagement with the valve-seat.

4. A shock absorber comprising in combination, a casing presenting a fluid reservoir and a cylinder; a piston in the cylinder forming a compression chamber therein, said piston having an opening in its head portion providing for the transfer of fluid from one side of the piston to the other; an annular flange providing a valve-seat in said piston; an annular groove in said piston, spaced from the valve-seat; a spider having its leg portions bent into seating engagement with the groove, said spider having a central hump portion extending toward the valve-seat; a valve between the spider and the valve-seat; and a spring one end of which is seated upon the spider, around the hump portion, the other end engages the valve, yieldably urging said valve into engagement with the valve-seat.

5. A shock absorber comprising in combination, a casing presenting a fluid reservoir and a cylinder; a piston in said cylinder forming a compression chamber therein, said piston having a head portion provided with a transverse slot forming a passage through which fluid may flow from one side of the piston to the other; a rocker shaft journalled in opposite walls of the casing, said shaft having a transverse slot providing a flat bottom wall; a rocker-arm, U-shaped in cross-section, and having transverse openings adjacent each end thereof, the rocker-shaft extending through the openings at one end of the rocker-arm; a wedge extending between the sides of the U-shaped rocker-arm and into the slot of the rocker-shaft so as to engage the flat bottom wall thereof, for securing the arm to the shaft; a pin extending through the transverse openings in the other end of the rocker arm; and a piston rod secured at one end to said pin, the other end extending through the slot in the piston and being yieldably connected with the piston.

6. A shock absorber comprising in combination, a casing presenting a fluid reservoir and a cylinder; a piston in the cylinder; a shaft supported transversely of the fluid reservoir said shaft having a flat portion; an oscillatable lever, U-shaped in cross-section so as to provide spaced parallel side portions connected by a web portion, said lever having alined openings in the side portions adjacent each end thereof, two of said alined openings receiving the shaft; a wedge member between the side portions of said lever, one edge of said member engaging the interior of the web portion of the lever the other edge engaging the flat portion of the shaft whereby the lever is secured to the shaft so as to be rotatable therewith; a pin in the alined openings at the opposite end of the lever; a link extending between the two side portions of the lever and secured to said pin; and a resilient member yieldably suspending the piston from the link and urging said piston into engagement with the lever.

In testimony whereof I hereto affix my signature.

EDWIN F. ROSSMAN.